(12) United States Patent
Li et al.

(10) Patent No.: US 10,813,108 B2
(45) Date of Patent: Oct. 20, 2020

(54) DATA THROUGHPUT IMPROVEMENT IN MULTI-SIM DEVICES

(71) Applicants: Gaoshan Li, Beijing (CN); Jia Tang, Santa Clara, CA (US); Zhibin Dang, Beijing (CN); Insung Kang, San Diego, CA (US); Lu Bai, Beijing (CN); Weihua Yang, Beijing (CN); QUALCOMM Incorporated, San Diego, CA (US)

(72) Inventors: Gaoshan Li, Beijing (CN); Jia Tang, Santa Clara, CA (US); Zhibin Dang, Beijing (CN); Insung Kang, San Diego, CA (US); Lu Bai, Beijing (CN); Weihua Yang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/317,514

(22) PCT Filed: Jul. 16, 2015

(86) PCT No.: PCT/CN2015/084221
§ 371 (c)(1),
(2) Date: Dec. 9, 2016

(87) PCT Pub. No.: WO2016/008428
PCT Pub. Date: Jan. 21, 2016

(65) Prior Publication Data
US 2017/0127436 A1   May 4, 2017

(30) Foreign Application Priority Data

Jul. 18, 2014 (WO) ................ PCT/CN2014/082464

(51) Int. Cl.
*H04W 72/12* (2009.01)
*H04W 52/22* (2009.01)
(Continued)

(52) U.S. Cl.
CPC ...... *H04W 72/1215* (2013.01); *H04B 1/3816* (2013.01); *H04B 17/318* (2015.01);
(Continued)

(58) Field of Classification Search
CPC ............. H04W 88/06; H04W 72/1215; H04W 52/367; H04W 72/14; H04W 52/245;
(Continued)

(56) References Cited

U.S. PATENT DOCUMENTS

| 8,363,576 B2 | 1/2013 | Willenegger et al. |
| 2009/0156256 A1 | 6/2009 | Shi |

(Continued)

FOREIGN PATENT DOCUMENTS

| CN | 1848721 A | 10/2006 |
| CN | 101184291 A | 5/2008 |

(Continued)

OTHER PUBLICATIONS

3GPP TS 25.321 V11.3.0, Dec. 2012, pp. 23, 173 and Annex B.*

(Continued)

*Primary Examiner* — Un C Cho
*Assistant Examiner* — Yu-Wen Chang

(57) ABSTRACT

Methods and apparatuses are presented for managing a multi-subscriber identity module (SIM) user equipment (UE) such that data throughput may be improved in a dual-SIM, dual active (DSDA) scenario. For example, a method is presented that includes acquiring first timing information of a first subscription and second timing information of a second subscription. Additionally, the example method may include detecting a first conflict between com- (Continued)

munications of the first subscription and the second subscription in a time slot of a first time interval. Moreover, the example method may include estimating one or more additional conflicts in one or more subsequent time intervals based on timing of the time slot, the first timing information, and the second timing information. Further, the example method may include respectively adjusting one or more transmit block sizes (TBS) for each of the one or more subsequent time intervals.

23 Claims, 10 Drawing Sheets

(51) Int. Cl.
 *H04W 52/24* (2009.01)
 *H04B 17/318* (2015.01)
 *H04B 1/3816* (2015.01)
 *H04W 52/36* (2009.01)
 *H04W 72/14* (2009.01)
 *H04W 88/02* (2009.01)
 *H04W 88/06* (2009.01)

(52) U.S. Cl.
 CPC ....... *H04W 52/223* (2013.01); *H04W 52/245* (2013.01); *H04W 52/367* (2013.01); *H04W 72/14* (2013.01); *H04W 88/02* (2013.01); *H04W 88/06* (2013.01)

(58) Field of Classification Search
 CPC .. H04W 52/223; H04W 88/02; H04B 1/3816; H04B 17/318
 See application file for complete search history.

(56) References Cited

U.S. PATENT DOCUMENTS

| | | |
|---|---|---|
| 2012/0057525 A1 | 3/2012 | Hou |
| 2012/0164948 A1 | 6/2012 | Narasimha et al. |
| 2012/0275403 A1* | 11/2012 | Zhang .................. H04B 7/0404 370/329 |
| 2013/0012135 A1 | 1/2013 | Ruohonen et al. |
| 2013/0329663 A1* | 12/2013 | Pelletier ............ H04W 72/0413 370/329 |
| 2014/0036967 A1 | 2/2014 | Akkarakaran et al. |
| 2014/0080459 A1* | 3/2014 | Taha .................. H04W 52/0287 455/414.1 |
| 2014/0099934 A1* | 4/2014 | Chen .................. H04W 52/0261 455/418 |
| 2014/0155119 A1* | 6/2014 | Bishop ................ H04W 52/367 455/552.1 |
| 2014/0187249 A1 | 7/2014 | Fu et al. |
| 2014/0200046 A1* | 7/2014 | Sikri ..................... H04W 52/38 455/552.1 |
| 2015/0071088 A1 | 3/2015 | Gottimukkala et al. |
| 2015/0319643 A1* | 11/2015 | Zhu ................... H04W 72/1215 370/336 |

FOREIGN PATENT DOCUMENTS

| | | |
|---|---|---|
| CN | 101677290 A | 3/2010 |
| CN | 102340372 B | 4/2014 |
| EP | 2 472 960 A1 | 7/2012 |
| GB | 2 492 577 A | 1/2013 |

OTHER PUBLICATIONS

3GPP TS 25.224 V11.1.0, Jan. 2013, Section 4.2.2.4.*
International Search Report and Written Opinion—PCT/CN2015/084221—ISA/EPO—dated Oct. 21, 2015. (10 total pages).
International Search Report and Written Opinion issued in International Application No. PCT/CN2014/082464, dated Apr. 16, 2015 (7 pages).
ETSI TS 125 321: "Universal Mobile Telecommunications System (UMTS); Medium Access Control (MAC) Protocol Specification (3GPP TS 25.321 Version 11.3.0 Release 11)", V11.3.0 (Jan. 2013), pp. 1-212.

* cited by examiner

DATA THROUGHPUT IMPROVEMENT IN MULTI-SIM DEVICES

CROSS REFERENCE TO RELATED APPLICATION

This application is based upon and claims the benefit of priority to PCT Application PCT/CN2015/084221, filed Jul. 16, 2015, which claims benefit to PCT Application PCT/CN2014082464, filed Jul. 18, 2014. The disclosure of the prior application is hereby incorporated by reference herein its entirety.

BACKGROUND

The present disclosure relates to the field of wireless communications and more particularly to the improvement of data throughput for a multi-subscriber identity module (SIM) user equipment (UE).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Additionally, some wireless devices are configured to facilitate communication via multiple unique subscriptions, each being associated with a SIM of multiple SIMs present on the device. In other words, multi-SIM devices (e.g., dual-SIM, dual standby (DSDS) and dual-SIM, dual active (DSDA) devices) may include one SIM associated with a first subscription and a second SIM associated with a second subscription. Furthermore, each subscription may be associated with one or more radio access technology (RAT) types. For example, in some multi-SIM devices, one SIM may be associated with a first subscription supporting TD-SCDMA and a second SIM associated with a second subscription supporting GSM only.

As the demand for mobile broadband access continues to increase, research and development continue to advance the UMTS technologies and multi-SIM device technologies, not only to meet the growing demand for mobile broadband access, but to advance and enhance the user experience with mobile communications.

SUMMARY

The following presents a simplified summary of one or more aspects of the disclosure in-order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes example methods and apparatuses for improving data throughput in a multi-subscriber identity module (SIM) user equipment (UE). For example, the disclosure presents an example method including acquiring first timing information of a first subscription and second timing information of a second subscription. The example method may further include detecting a first conflict in allocating a time slot of a first time interval between the first subscription and the second subscription. In addition, the example method may include estimating one or more additional conflicts in one or more subsequent time intervals based on timing of the time slot and on the first timing information and the second timing information relative to the time slot. Furthermore, the example method may include determining a first transmit power limitation for the one or more conflicted time slots and a second transmit power limitation for the one or more non-conflicted time slots. Further still, the example method may include adjusting one or more transport block sizes (TBS) for the one or more conflicted time slots and the one or more non-conflicted time slots of each of the one or more subsequent time intervals respectively based on the first transmit power limitation and the second transmit power limitation.

In an additional aspect, the present disclosure presents an example apparatus that may include an information register configured to acquire first timing information of a first subscription and second timing information of a second subscription. Further, the example apparatus may include a conflict detector configured to detect a first conflict between communications of the first subscription and the second subscription in a time slot of a first time interval. In addition, the example apparatus may include a conflict estimator configured to estimate one or more additional conflicts in one or more subsequent time intervals based on timing of the time slot and on the first timing information and the second timing information relative to the time slot. Furthermore, the example apparatus may include a transmit power determiner configured to determine a first transmit power limitation for the one or more conflicted time slots and a second transmit power limitation for the one or more non-conflicted time slots. Further still, the example apparatus may include a block size manager configured to adjust one or more TBSs for the one or more conflicted time slots and the one or more non-conflicted time slots of each of the one or more subsequent time intervals respectively based on the first transmit power limitation and the second transmit power limitation.

In an additional aspect, the present disclosure presents a computer-readable medium storing computer executable code for improving data throughput in a multi-subscriber identity module (SIM) user equipment (UE). The computer-readable medium may include code for acquiring first timing information of a first subscription and second timing information of a second subscription. Additionally, the computer-readable medium may include code for detecting a first conflict between communications of the first subscription and the second subscription in a time slot of a first time interval. Moreover, the computer-readable medium may include code for estimating one or more additional conflicts in one or more subsequent time intervals based on timing of the time slot and on the first timing information and the second timing information relative to the time slot. Furthermore, the computer-readable medium may include code for determining a first transmit power limitation for the one or more conflicted time slots and a second transmit power limitation for the one or more non-conflicted time slots. Further still, the computer-readable medium may include code for adjusting one or more TBSs for the one or more conflicted time slots and the one or more non-conflicted time slots of each of the one or more subsequent time intervals respectively based on the first transmit power limitation and the second transmit power limitation.

In yet another aspect, the present disclosure presents an apparatus that may include means for acquiring first timing information of a first subscription and second timing information of a second subscription. Moreover, the example apparatus may include means for detecting a first conflict between communications of the first subscription and the second subscription in a time slot of a first time interval. In addition, the example apparatus may means for estimating one or more additional conflicts in one or more subsequent time intervals based on timing of the time slot and on the first timing information and the second timing information relative to the time slot. Furthermore, the example apparatus may include means for determining a first transmit power limitation for the one or more conflicted time slots and a second transmit power limitation for the one or more non-conflicted time slots. Further still, the example apparatus may include means for adjusting one or more TBSs for the one or more conflicted time slots and the one or more non-conflicted time slots of each of the one or more subsequent time intervals respectively based on the first transmit power limitation and the second transmit power limitation.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a DSDA scenario, both of the SIM for TD-SCDMA and the SIM for GSM may be communicating with a network for data services and voice services respectively such as the UE may receive data services, e.g., file downloading, during voice services, e.g., a phone call. In other words, there may be transport blocks for channels of different SIMs in one or more particular time slots. Thus, transmission of transport blocks for one SIM may cause interferences to the transmission of transport blocks of another SIM. One solution is to reduce, i.e., back off, the transmission power for data services, e.g., transmission power for Enhanced Physical Uplink Channel (EPUCH), to mitigate interferences to voice services, e.g., GSM. However, as a result, the reduced transmission power may not be sufficient to support the originally determined transport block size (TBS) and may further cause higher block error ratio (BLER) and a lower throughput for enhanced uplink (EUL) than normal transmission power.

The present disclosure presents methods and apparatuses for improving data throughput in a multi-SIM UE. In an aspect of the present disclose, a first subscription, e.g., GSM, of the multi-SIM UE may initiate and conduct a call using a shared radio resource of the UE and a second subscription, e.g., TD-SCDMA, may initiate and receive data services simultaneously. Since the reduced transmission power for data services may not support the originally determined TBS for data services, the UE may adjust the TBS of time slots in other subframes to improve overall data throughput. That is, the UE may first acquire timing information of the multiple subscriptions. Once the UE detects a conflict in a subframe, the UE may then estimate future conflicts and those time slots that will be affected by the future conflicts based on the timing of the conflict and the timing information of the multiple subscriptions. By adjusting the TBS of each subsequent subframe that will be affected by the future conflicts, the UE may lower the BLER and improve the overall data throughput.

Figure 1:
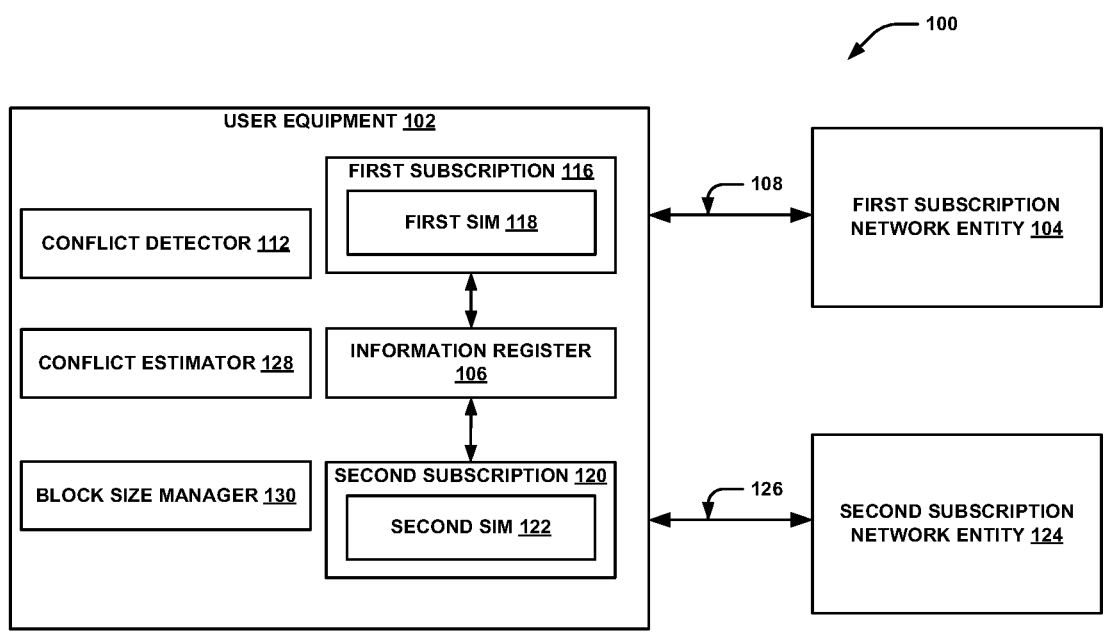
FIG. 1 is a block diagram illustrating an example wireless communication system in which the data throughput improvement may be implemented.

FIG. 1 is a schematic diagram illustrating a system 100 for wireless communication, according to an example configuration. FIG. 1 includes an example first subscription network entity 104, which may communicate wirelessly with a first subscription 116 of one or more UEs 102 over one or more wireless communication channels 108, which may include, in a non-limiting aspect, data communication channels and control channels. Additionally, FIG. 1 includes an example second subscription network entity 124, which may communicate wirelessly with a second subscription 120 of one or more UEs 102 over one or more wireless communication channels 126, which may include, in a non-limiting aspect, data communication channels, paging channels, paging indicator channels, and control channels. During a call conducted by the first subscription 116, communication with second subscription network entity 124 may continue to receive data services, e.g., file downloading, video/audio streaming, etc.

UE 102 may comprise any type of mobile device, such as, but not limited to, a smartphone, cellular telephone, mobile phone, laptop computer, tablet computer, a device associated with the Internet of Things (IoT), or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, UE 102 may be small and light enough to be considered portable and may be configured to communicate wirelessly via an over-the-air communication link using one or more OTA communication protocols described herein.

Additionally, in some examples, UE 102 may be configured to facilitate communication on two separate networks via two separate subscriptions, such as, but not limited to, a first subscription 116 and a second subscription 120. As such, UE 102 may comprise a multi-SIM UE (e.g., dual-SIM, dual active (DSDA) UE), which may include two SIM cards—a first SIM card 118 for the first subscription 116 and a second SIM card 122 for the second subscription 120. Furthermore, although only two SIMs and two subscriptions are illustrated in FIG. 1, the UE 102 may contain any number of subscriptions and related SIMs. For example, in some examples, each subscription may facilitate communication via a plurality of radio access technologies (RATs) or may facilitate communication via a single RAT. As such, in a non-limiting example, first subscription 116 may comprise a Time Division Multiple Access (TDMA) and GSM subscription and the second subscription 120 may comprise a GSM-only subscription. However, the specific RAT or RATs supported by a particular subscription may comprise any RAT or RATs known in the art and/or disclosed herein. The two subscriptions may include modules or applications that, along with information from the respective SIM, provide functionality and/or perform operations that facilitate communication with one or more RATs.

In an aspect, communication channels 108 and 126 may comprise any over-the-air (OTA) communication channel, including, but not limited to, one or more data or control communication channels operating according to specifications promulgated by 3GPP and/or 3GPP2, which may include first generation, second generation (2G), 3G, 4G, etc. wireless network communication protocols.

Furthermore, UE 102 may include an information register 106 that may be configured to acquire timing information of first subscription 116 and second subscription 120. Such timing information may at least include a first periodicity of time intervals for transmitting transport blocks for data services and a second periodicity of transport blocks for voice services. In most cases, the first periodicity may be different from the second periodicity. The timing information may further include start and end timing of the time intervals and the transport blocks for voice services. As referenced herein, the time intervals may also be interchangeably referred to as "subframes." Each subframe may include one or more time slots for transmitting data packets or other information. In an aspect, the timing information may be transmitted to or retrieved by other components of UE 102 as a basis for estimating the future conflicts.

In addition, UE 102 may include a conflict detector 112 that may be configured to detect a first conflict between communications of first subscription 116 and second subscription 120 in at least one time slot of a subframe. In other words, while second subscription 120 is transmitting and/or receiving data packets for data services in the at least one time slot, conflict detector 112 may detect the first conflict when first subscription 116 is conducting a phone call via communication channel 108 in the same at least one time slot.

UE 102 may further include a conflict estimator 128 that may be configured to estimate one or more additional conflicts (interchangeably referenced as "future conflicts") in the subsequent subframes of second subscription 120 based on the timing of the first conflict and on the first and the second periodicity included in the timing information acquired by information register 106. Although the first conflict may not be predicted due to unpredictable user behaviors, e.g., the exact time point that the user initiates a phone call, future conflicts in subsequent subframes may nevertheless be estimated based on the timing of the first conflict. Particularly, conflict estimator 128 may be configured to identify, for second subscription 120, one or more conflicted time slots, in which at least one of the one or more additional conflicts is estimated, and one or more non-conflicted time slots, in which none of the one or more additional conflicts is estimated. Conflicted time slots may refer to the time slots in which both SIMs are communicating with respective subscription network entities. Non-conflicted time slots may refer to the time slots when there is no such concurrent or simultaneous communication. The estimating is described in greater detail in accordance with FIG. 4.

Further, UE 102 may include a transmit power determiner 132 configured to determine a first transmit power limitation for the one or more conflicted time slots and a second transmit power limitation for the one or more non-conflicted time slots. In an aspect, such determination may be made based on an enhanced dedicated channel (E-DCH) Absolute Grant Channel (EAGCH) grant received from second subscription network entity 124. The EAGCH grant may include a maximum transmit power limitation (MTPL) and a power back off value for each of the one or more subsequent time intervals. For example, the EAGCH may include power resource-related information (PRRI), timeslot resource related information (TRRI), MTPL, etc. Transmit power determiner 132 may then configure the first transmit power limitation for the one or more conflicted time slots to be the power back off value and the second transmit power limitation for the one or more non-conflicted time slots to be the MTPL.

Furthermore, UE 102 may include a block size manager 130 that may be configured to respectively adjust TBS for each of the subsequent subframes. In an aspect of the present disclosure, block size manager 130 may be configured to determine a first E-DCH Transport Format Combination Indicator (E-TFCI) for the one or more conflicted time slots based on the first transmit power limitation and a second E-TFCI for the one or more non-conflicted time slots based on the second transmit power limitation. Based on the first E-TFCI and the second E-TFCI, block size manager 130 determine a third E-TFCI for each of the one or more subsequent time intervals from a look-up table based on the first E-TFCI, the second E-TFCI. The third E-TFCI may refer to a combined or effective E-TFCI for the one or more subsequent time intervals. Further, block size manager 130 may be configured to determine a TBS respectively for each of the subsequent subframes based on the third E-TFCI. Block size manager 130 is described in greater detail in accordance with FIG. 2.

UE 102 may further include a processor 152, a memory 154, and a transceiver 156 for data throughput improvement. Respective examples of processor 152, memory 154, and transceiver 156 may be processor 604, computer-readable medium 606, and transceiver 610 in FIG. 6

Furthermore, first subscription network entity 104 and second subscription network entity 124 of FIG. 1 may comprise one or more of any type of network module, such as an access point, a macro cell, including a base station (BS), node B, eNodeB (eNB), a relay, a peer-to-peer device, an authentication, authorization and accounting (AAA) server, a mobile switching center (MSC), a radio network controller (RNC), or a small cell. As used herein, the term "small cell" may refer to an access point or to a corresponding coverage area of the access point, where the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. As such, a small cell may include, but is not limited to, an apparatus such as a base station (BS), an access point, a femto node, a femtocell, a pico node, a micro node, a Node B, evolved Node B (eNB), home Node B (HNB) or home evolved Node B (HeNB). Therefore, the term "small cell," as used herein, refers to a relatively low transmit power and/or a relatively small coverage area cell as compared to a macro cell. Additionally, first subscription network entity 104 may communicate with one or more other network entities of wireless and/or core networks Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (WCDMA) system, and may communicate with one or more UEs 102 according to this standard. As those skilled in the art will readily appreciate, various aspects described throughout this disclosure may be extended to other telecommunication systems, network architectures and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the network(s) (e.g., UEs 102, first subscription network entity 104, second subscription network entity 124) may be coupled to a core network via one or more wired or wireless connections.

Figure 2:
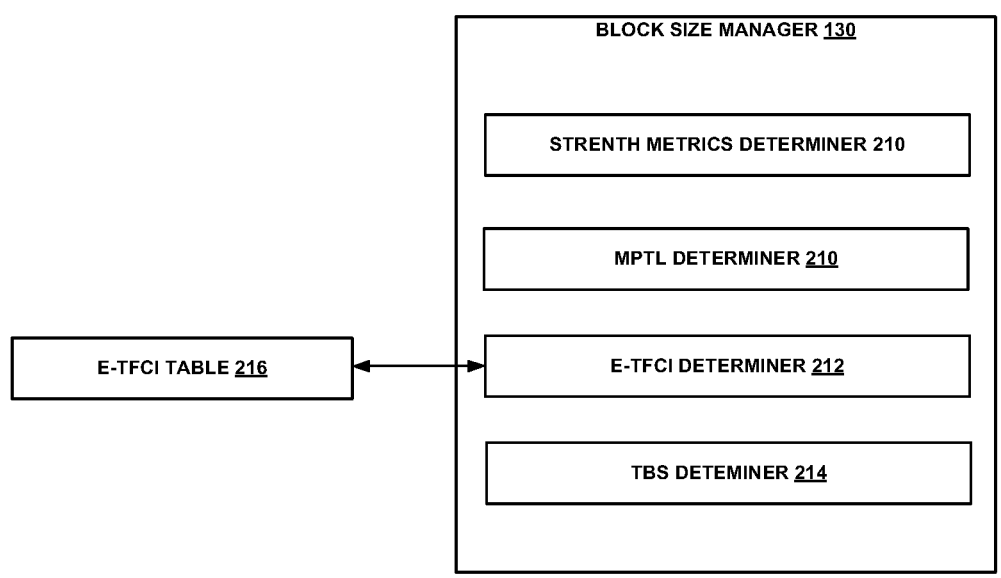
FIG. 2 is a block diagram illustrating an example block size manager by which the data throughput improvement may be implemented.

Turning to FIG. 2, an example block size manager 130 (of FIG. 1, for example) is presented as comprising a plurality of individual components for carrying out the one or more methods or processes described herein. For example, in an aspect, block size manager 130 may include a strength metrics determiner 210 that may be configured to monitor and determine at least one signal strength-related metric, e.g., received signal strength indication (RSSI), of first subscription 116 and/or second subscription 120 within a first subframe. In at least one example, RSSI of first subscription 116 may not vary significantly during the subsequent subframes. Thus, the RSSI of the first subframe may serve as a basis for transmit power determiner 132 to determine transmit powers for the subsequent subframes, that is, to determine the transmit power of the second subscription 120 needs to be lowered to reduce the interference caused to the transmission of the first subscription 116.

Furthermore, block size manager 130 may include an enhanced dedicated channel (E-DCH) Transport Format Combination Indicator (E-TFCI) determiner 212 that may be configured to determine E-TFCI values respectively for the non-conflicted time slots and conflicted time slots. Such determination may be based on the first transmit power limitation determined by transmit power determiner 132 for the conflicted time slots and the second transmit power limitation determined by transmit power determiner 132 for the non-conflicted time slots. In an aspect, E-TFCI determiner 212 may be configured to access an E-TFCI table 216 that includes correspondences between different transmit power values and a plurality of E-TFCI values. Thus, E-TFCI determiner 212 may retrieve E-TFCI values that respectively correspond to the MTPL and the power back off value included in the EAGCH grant. One of the retrieved E-TFCI values may indicate a TBS for the non-conflicted time slots and the other of the retrieved E-TFCI values may indicate another TBS for the conflict time slots. Further, based on the respective E-TFCI values determined for the conflicted time slots and the non-conflicted time slots, E-TFCI determiner 212 may determine a third E-TFCI for each of the one or more subsequent time intervals.

With respect to each subsequent subframe, E-TFCI determiner 212 may sum up the TBSs determined for all time slots in the subframe to determine the third E-TFCI. In a non-limiting example where the subframe includes four time slots, two of which are identified as conflicted time slots, E-TFCI determiner 212 may determine a TBS of 1000 bits for the two non-conflicted time slots, and another TBS of 200 bits for the two conflicted time slots. E-TFCI determiner 212 may further sum up the TBSs for all the time slots, e.g., 2400 bits, and calculate the third E-TFCI for the subframe such that the number of bits carried by the subframe is closest to 2400 bits and less than 2400 bits.

Additionally, block size manager 130 may include a TBS determiner 214 that may be configured to determine a TBS for each of the subsequent subframes based on the third E-TFCI determined by E-TFCI determiner 212. Such determination may be made based on a one-to-one mapping between an E-TFCI and a TBS specified in 3GPP specification. The overall data throughput may then be improved by utilizing the TBS determined based on the third E-TFCI for each of the subsequent subframes.

Figure 3:
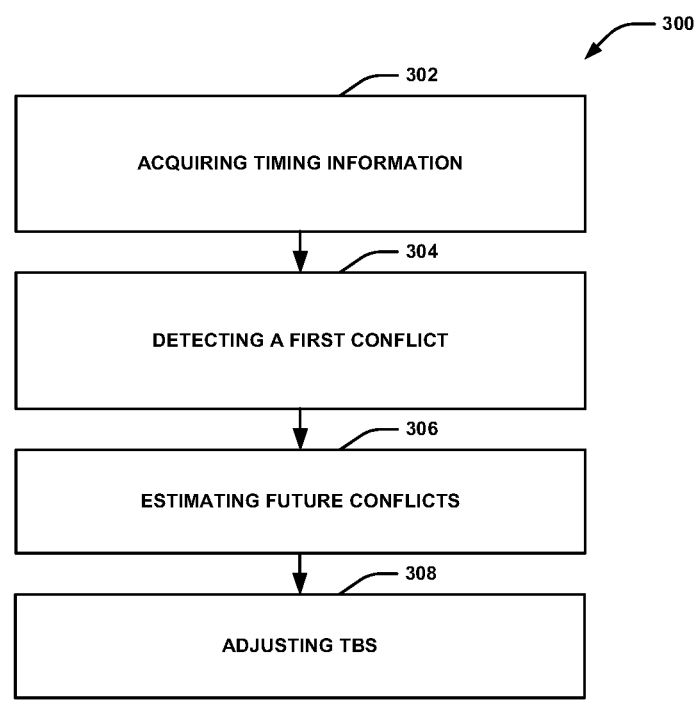
FIG. 3 is a flow diagram comprising a plurality of functional blocks representing an example methodology by which the data throughput improvement may be implemented.

FIG. 3 presents an exemplary methodology 300 comprising a non-limiting set of operations and/or functions represented as blocks that may be performed by an apparatus described herein (e.g. user equipment 102 of FIG. 1, block size manager 130 of FIGS. 1 and 2). In an aspect, methodology 300 may comprise a method of improving data throughput at a multi-SIM UE, and may include, at block 302, acquiring, first timing information of first subscription 116 and second timing information of second subscription 120. For example, information register 106 of FIG. 1 may perform the operation described with respect to block 302. As described above, such timing information may at least include a first periodicity of subframes for transmitting transport blocks for data services and a second periodicity of transport blocks for voice services. The timing information may further include start and end timing of the time intervals and the transport blocks for voice services.

Furthermore, methodology 300 may include, at block 304, detecting a first conflict between communications of the first subscription and the second subscription in a time slot of a first subframe. For example, conflict detector 112 of FIG. 1 may perform the operation described with respect to block 304. In at least one example, the first conflict may be detected by monitoring interferences on communications of first subscription 116 and second subscription 120.

Additionally, methodology 300 may include, at block 306, estimating one or more future conflicts in subsequent subframes based on the timing of the time slot, in which the first conflict is detected, together with the first timing information and the second timing information. For example, conflict estimator 128 of FIG. 1 may perform the operation described with respect to block 306. Although the first conflict may not be predicted due to unpredictable user behaviors, e.g., the exact time point that the user initiates a phone call, future conflicts in subsequent subframes may nevertheless be estimated based on the timing of the first conflict. Particularly, conflict estimator 128 may be configured to identify, for second subscription 120, one or more conflicted time slots, in which at least one of the one or more additional conflicts is estimated, and one or more non-conflicted time slots, in which none of the one or more additional conflicts is estimated.

Further, methodology 300 may include, at block 308, determining a first transmit power limitation for the one or more conflicted time slots and a second transmit power limitation for the one or more non-conflicted time slots. For example, transmit power determiner 132 may be configured to make such determination based on an EAGCH grant received from second subscription network entity 124. The EAGCH grant may include an MTPL and a power back off value for each of the one or more subsequent time intervals. Transmit power determiner 132 may then configure the first transmit power limitation for the one or more conflicted time slots to be the power back off value and the second transmit power limitation for the one or more non-conflicted time slots to be the maximum transmit power limitation.

Furthermore, methodology 300 may include, at block 310, adjusting one or more TBSs for the one or more conflicted time slots and the one or more non-conflicted time slots of each of the one or more subsequent time intervals respectively based on the first transmit power limitation and the second transmit power limitation. For example, block size manager 130 of FIG. 1 may perform the operation with respect to block 310. That is, strength metrics determiner 210 of block size manager 130 may be configured to monitor and determine at least one signal strength-related metric, e.g., received signal strength indication (RSSI), of first subscription 116 and/or second subscription 120 in a first subframe. Based on the signal strength-related metrics, transmit power determiner 132 may be configured to determine the first transmit power limitation for the conflicted time slots and the second transmit power limitation for the non-conflicted time slots for each of the subsequent subframes to mitigate the interferences on the communication of first subscription 116. Further, E-TFCI determiner 212 of block size manager 130 may be configured to determine E-TFCI values for the conflicted and non-conflicted time slots from a look-up table, e.g., E-TFCI table 216, based on the first transmit power limitation determined for the conflicted time slots and the second transmit power limitation determined for the non-conflicted time slots. Further, E-TFCI determiner 212 may determine a third E-TFCI for each of the one or more subsequent time intervals based on the determined E-TFCI values. Thus, based on the third E-TFCI value, TBS determiner 214 of block size manager 130 may determine a TBS for each subsequent subframe. The overall data throughput may then be improved by utilizing the TBS in each of the subsequent subframes.

Figure 4:
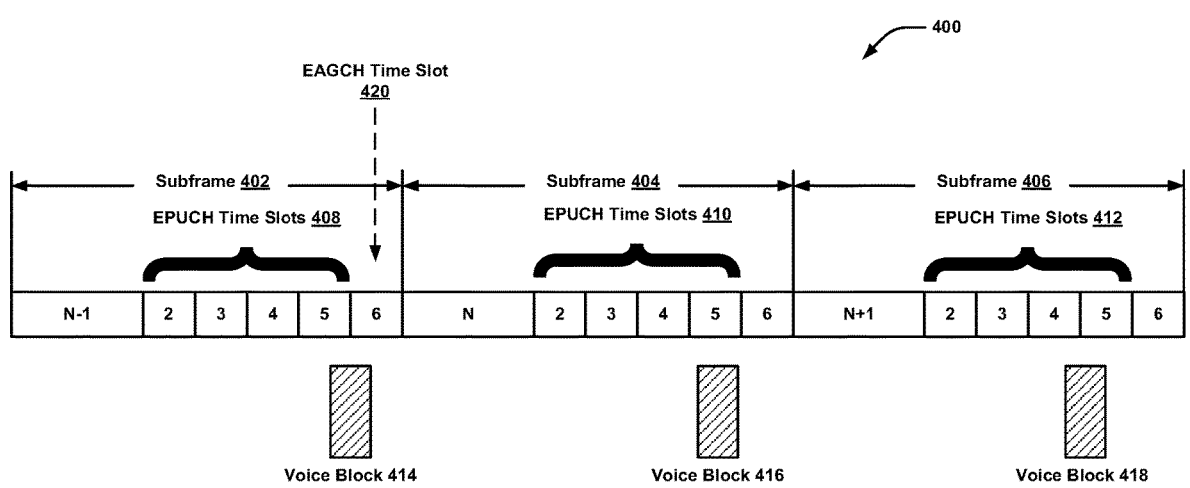
FIG. 4 is a diagram illustrating an example frame work of respective channels of different SIMs in which the data throughput improvement may be implemented.

FIG. 4 is a conceptual diagram illustrating an example frame work 400 of respective channels of different SIMs in which the data throughput improvement may be implemented. Example frame work 400 may include, at least, subframes 402, 404, and 406. Within each of subframes 402, 404, and 406, there may be one or more EPUCH time slots, e.g., 408, 410, and 412. An EAGCH time slot 420 may be included in at least one of subframes 402, 404, and 406. One or more voice blocks 414, 416, and 418 may be transmitted for first subscription 116 while subframes 402, 404, and 406 are transmitted for second subscription 120. Even though we refer blocks 414, 416, and 418 as "voice blocks," one skilled in the art should appreciate blocks 414, 416, and 418 may also refer to other types of blocks, e.g., data service blocks.

Subframes 402, 404, and 406 may refer to any three consecutive time intervals for communication of second subscription 120. Data packets, control information, and/or resource allocation information may be transmitted or received over subframes 402, 404, and 406. In a non-limiting example, each of subframes 402, 404, and 406 may include four consecutive EPUCH for data transmission and one EAGCH time slot, e.g., EAGCH time slot 420, for control information transmission.

In at least one example, voice block 414 may refer to a first voice block utilized for providing voice service to the user, e.g., the first voice packet of a phone call initiated by the user. As illustrated, voice block 414 conflicts with one of EPUCH time slots 408, e.g., time slot 5, and EAGCH time slot 420. Since voice services may be deemed as of higher priority than data services, the transmit power of time slot 5 of EPUCH time slots 408 and EAGCH time slot 420 may be reduced to mitigate the interference to voice block 414. However, as stated above, the reduced transmit power may lower the overall data throughput.

Further, since the periodicity of subframes 402, 404, and 406 and the periodicity of voice block 414 are included in the timing information provided by first subscription 116 and second subscription 120, conflict estimator 128 may estimate future conflicts in subsequent subframes 404 and 406.

Referring to subframe 406 as an example, conflict estimator 128 may estimate that voice block 418 will conflict with time slots 4 and 5 of EPUCH time slots 412. Based on the RSSI of first subscription 116 detected in subframe 402 by strength metrics determiner 210, transmit power determiner 132 may determine a first transmit power limitation for time slots 4 and 5 and a second transmit power limitation for time slots 2 and 3. Further, E-TFCI determiner 212 may then access E-TFCI table 216 and retrieve two E-TFCI values from E-TFCI table 216 in accordance with the respective transmit power limitations. One of the E-TFCI values may be assigned for the non-conflicted time slots, e.g., time slots 2 and 3, and the other E-TFCI value may be assigned for the conflicted time slots, e.g., time slots 4 and 5. Further, E-TFCI determiner 212 may generate a third E-TFCI value based on the two E-TFCI values. TBS determiner 214 may then determine or calculate a TBS corresponding to the third E-TFCI for each subsequent subframe. By implementing the methodology to each subframe, the overall data throughput may be improved.

Figure 5A:
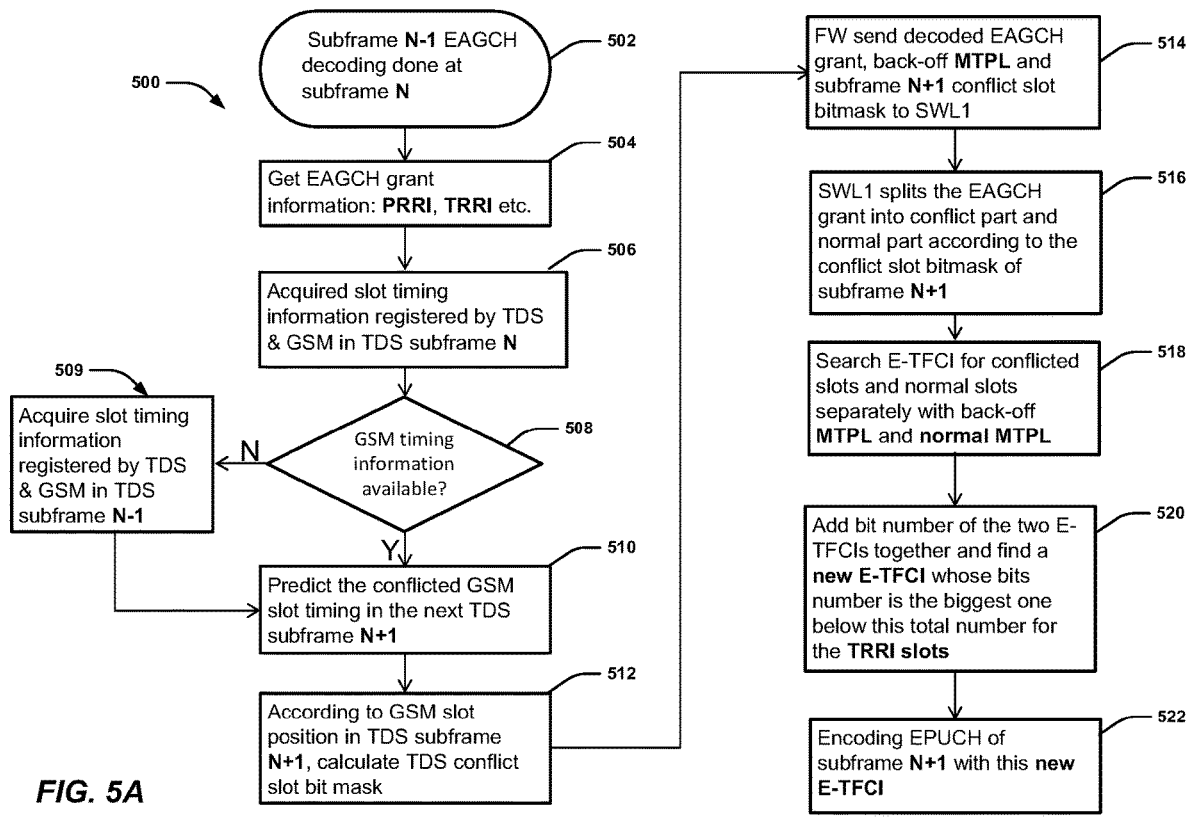
FIG. 5A is a flow diagram comprising a plurality of functional blocks represent another example methodology by which the data throughput improvement may be implemented.

FIG. 5A is a flow diagram comprising a plurality of functional blocks represent another example methodology by which the data throughput improvement may be implemented.

Block 502 may refer to UE 102 decoding data packets carried by EAGCH time slot 406. Block 504 may refer to UE 102 retrieving EAGCH grant information from the decoded data packets. The EAGCH grant information may at least include power information, e.g., PRRI, and timing information, e.g., TRRI, etc. Block 506 may refer to information register 106 acquiring timing information from first subscription 116 and second subscription 120. As described above, the timing information may at least include a first periodicity of time intervals for transmitting transport blocks for data services and a second periodicity of transport blocks for voice services.

Decision block 508 may refer to UE 102 determining whether the timing information of first subscription 116 is available. If yes, the process flow may continue to block 510. If not, the process flow may continue to block 509, in which information register 106 may be configured to acquire timing information for first subscription 116 in the next subframe.

Block 510 may refer to conflict estimator 128 predicting future conflicts in subframe 406 based on the timing of the first conflict, the first and the second periodicity included in the timing information acquired by information register 106. Block 512 may refer to conflict estimator 128 further estimating the conflicted time slots and calculating conflict time slot bit masks which indicate which time slots of the second subscription are to be affected by the transmit blocks of the first subscription.

Block 514 may refer to a firmware component transmit an EAGCH grant, a power back off value, an MTPL, and the bitmasks of the conflicted time slots to a software component.

Block 516 may refer to the software component splitting the EAGCH grant into conflict part and non-conflict part according to the conflict slot bitmask of subframe 406. For example, transmit power determiner 132 may be configured to determine a first transmit power limitation for the one or more conflicted time slots and a second transmit power limitation for the one or more non-conflicted time slots. That is, transmit power determiner 132 may configure the first transmit power limitation for the one or more conflicted time slots corresponds to the power back off value and the second transmit power limitation for the one or more non-conflicted time slots corresponds to the MTPL.

Block 518 may refer to E-TFCI determiner 212 determining E-TFCI values respectively for the non-conflicted time slots and conflicted time slots. Such determination may be based on first transmit power limitation determined for the conflicted time slots and the second transmit power limitation determined for the non-conflicted time slots.

Block 520 may refer to E-TFCI determiner 212 combining the two E-TFCI values to generate a third E-TFCI value. Each EPUCH slots number combination (e.g. 1 slot EPUCH, 2 slots EPUCH etc.) has a TBS index table. Suppose the TBS index of the conflicted time slots is E-TFCI A, and the TBS index of the non-conflicted time slots is E-TFCI B. E-TFCI determiner 212 may add bit number of the two E-TFCI together and find in the TBS table of the whole TRRI slots—conflicted EPUCH slots number plus normal EPUCH slots number—a third E-TFCI C whose bits number is the biggest one below the sum of the bit number of E-TFCI A and E-TFCI B. TBS determiner 214 may further determine a new TBS corresponding to the third E-TFCI C for subframe 406.

Block 522 may refer to UE 102 encoding EPUCH of subframe 406 with a third E-TFCI corresponding to the calculated new TBS.

Figure 5B:
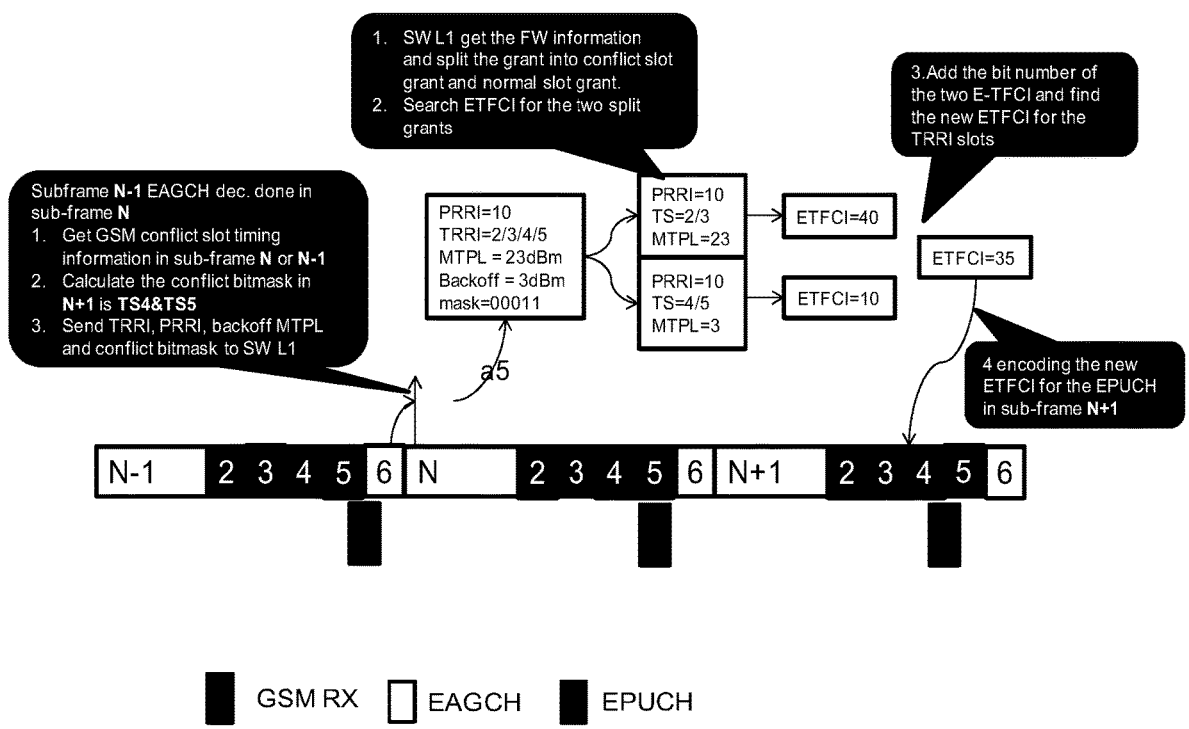
FIG. 5B is a diagram illustrating another example frame work of respective channels of different SIMs in which the data throughput improvement may be implemented.

FIG. 5B is a diagram illustrating another example frame work of respective channels of different SIMs in which the data throughput improvement may be implemented. That is, FIG. 5B describes an example of capacity calculation for conflict E-PUCH by EAGCH grant split and combine method.

As a non-limiting example, an EAGCH grant may include a PRRI value of 10, a TRRI value of 2/3/4/5, a MTPL value of 23 dBm, a bit mask of 00011. Transmit power determiner 132 may be configured to split the EAGCH grant by configuring different transmit power limitations respectively for the conflicted time slots and the non-conflicted time slots. In this example, the transmit power limitation of time slots 2 and 3 of subframe N+1 may be configured to be the MTPL value in the EAGCH grant, e.g., 23 dBm, and the transmit power limitation of time slots 4 and 5 of subframe N+1 may be configured to be the power back off value in the EAGCH grant, e.g., 3 dBm. Further, block size manager 130 may be configured to determine two respective E-TFCI values for the conflicted time slots and the non-conflicted time slots, e.g., 40 for the non-conflicted time slots and 10 for the conflicted time slots, from a look-up table, e.g., E-TFCI table 216. Based on the two E-TFCI values, block size manager 130 determine a third E-TFCI value, e.g., 35, for subframe N+1. Further, block size manager 130 may determine a TBS for subframe N+1 based on the third E-TFCI value.

Figure 6:
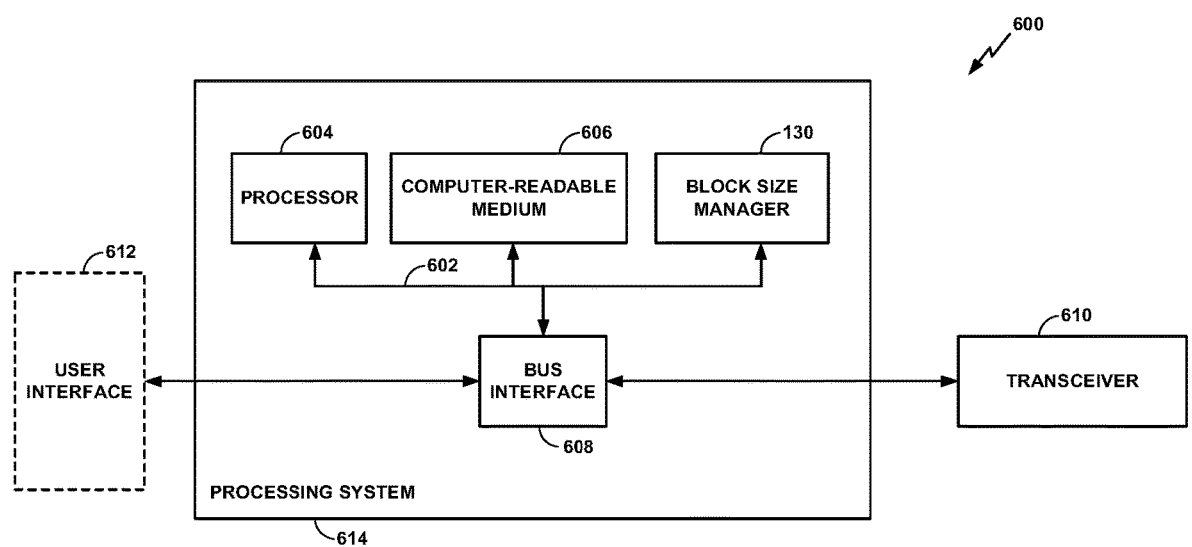
FIG. 6 is a diagram illustrating an example of a hardware implementation for an apparatus employing a processing system.

FIG. 6 is a conceptual diagram illustrating an example of a hardware implementation for an apparatus 600 employing a processing system 614. In some examples, the processing system 614 may comprise a UE or a component of a UE (e.g., UE 102 of FIG. 1). In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, computer-readable media, represented generally by the computer-readable medium 606, and block size manager 130 (see FIGS. 1 and 2), which may be configured to carry out one or more methods or procedures described herein.

The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described infra for any particular apparatus. The computer-readable medium 606 may also be used for storing data that is manipulated by the processor 604 when executing software. Furthermore, in some examples, block size manager 130 may be implemented as hardware, software, or a combination of hardware and software in the processing system 614. For example, computer-readable medium 606 may include instructions that, when executed by processor 604, may perform one or more of the aspects of block size manager 130 described herein. In addition, the components of block size manager 130 presented in FIG. 2 may likewise be implemented as hardware, software, or a combination of hardware and software in the processing system 614.

Figure 7:
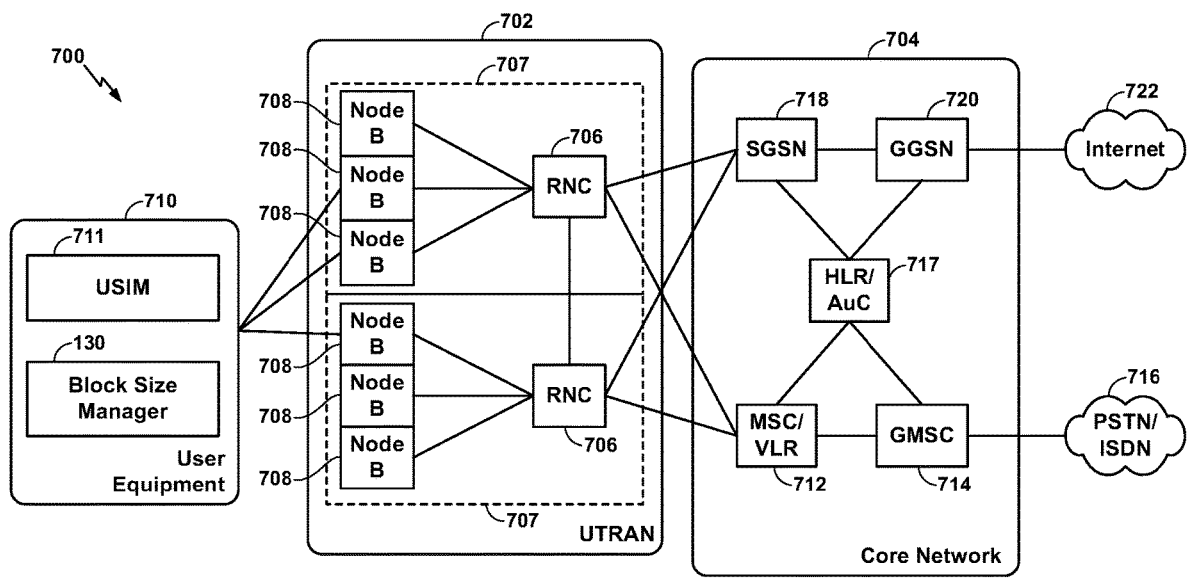
FIG. 7 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 7 are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708 may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 27.331 v9.1.0, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNS 707 may include any number of wireless Node Bs. The Node Bs 708 provide wireless access points to a core network (CN) 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. In an aspect, UE 710 may be a multi-SIM device and may include a block size manager 130 as described in relation to FIGS. 1 and 2, above. For illustrative purposes, one UE 710 is shown in communication with a number of the Node Bs 708. The downlink (DL), also called the forward link, refers to the communication link from a Node B 708 to a UE 710, and the uplink (UL), also called the reverse link, refers to the communication link from a UE 710 to a Node B 708.

The core network 704 interfaces with one or more access networks, such as the UTRAN 702. As shown, the core network 704 is a GSM core network. However, as those skilled in the art will recognize, the various concepts presented throughout this disclosure may be implemented in a RAN, or other suitable access network, to provide UEs with access to types of core networks other than GSM networks.

The core network 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a visitor location register (VLR) that contains subscriber-related information for the duration that a UE is in the coverage area of the MSC 712. The GMSC 714 provides a gateway through the MSC 712 for the UE to access a circuit-switched network 716. The core network 704 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The core network 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 708 and a UE 710. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 8:
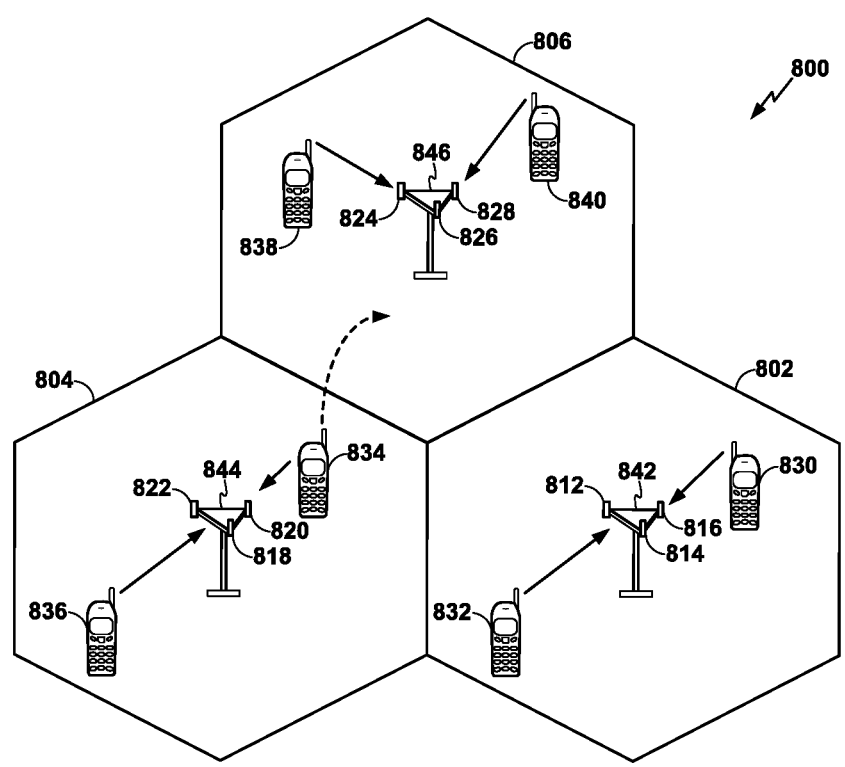
FIG. 8 is a conceptual diagram illustrating an example of an access network.

Referring to FIG. 8, an access network 800 in a UTRAN architecture is illustrated. In an example aspect, the UTRAN architecture may be associated with a network of a primary and/or secondary subscription of UE 102 where UE 102 comprises a multi-SIM device. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., User Equipment or UEs, which may be in communication with one or more sectors of each cell 802, 804 or 806. For example, UEs 830 and 832 may be in communication with Node B 842, UEs 834 and 836 may be in communication with Node B 844, and UEs 838 and 840 (which may represent UE 102 of FIG. 1) can be in communication with Node B 846. Here, each Node B 842, 844, 846 is configured to provide an access point to a core network 204 (see FIG. 2) for all the UEs 830, 832, 834, 836, 838, 840 in the respective cells 802, 804, and 806. In an aspect, each of the UEs presented in FIG. 8 may comprise UE 102 of FIG. 1 and may include a block size manager 130 of FIGS. 1 and 2.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 9:
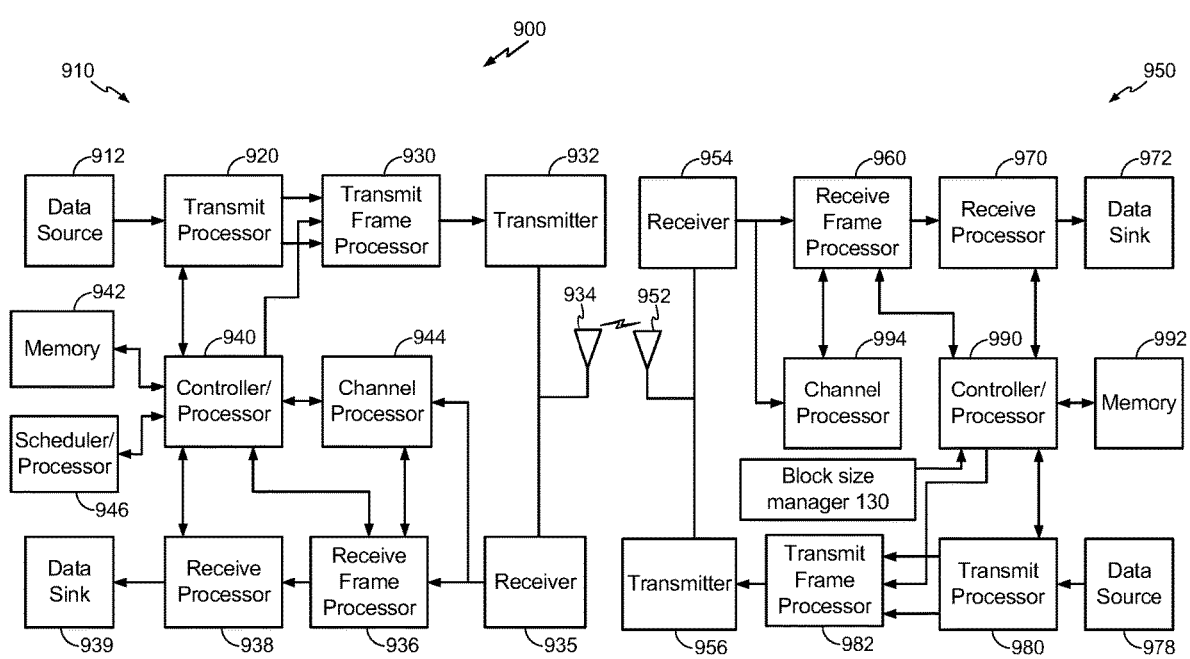
FIG. 9 is a block diagram conceptually illustrating an example of a Node B in communication with a UE in a telecommunications system.

FIG. 9 is a block diagram of a Node B 910 in communication with a UE 950, where the Node B 910 may be the first subscription network entity 104 in FIG. 1, and the UE 950 may be the UE 102 of FIG. 1. For example, UE 950 may be a multi-SIM device and may include block size manager 130 and may be configured to perform the functions associated with block size manager 130 presented throughout the present disclosure. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to an HSPA system. As those skilled in the art will readily appreciate, various aspects described throughout this disclosure may be extended to other telecommunication systems, network architectures and communication standards.

By way of example, various aspects may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

We claim:

1. A method for improving data throughput in a multi-subscriber identity module (SIM) user equipment (UE), comprising:
    acquiring first timing information of a first subscription and second timing information of a second subscription;
    detecting a first conflict between communications of the first subscription and the second subscription in a time slot of a first time interval;
    estimating one or more additional conflicts in one or more subsequent time intervals based on timing of the time slot and on the first timing information and the second timing information relative to the time slot;
    determining, for each of the one or more subsequent time intervals, a first transmit power limitation for one or more conflicted time slots and a second transmit power limitation for one or more non-conflicted time slots, the first transmit power limitation being different than the second transmit power limitation;
    determining a first enhanced dedicated channel (E-DCH) Transport Format Combination Indicator (E-TFCI) for the one or more conflicted time slots based on the first transmit power limitation;
    determining a second E-TFCI for the one or more non-conflicted time slots based on the second transmit power limitation;
    determining a third E-TFCI for each of the one or more subsequent time intervals based on the first E-TFCI and the second E-TFCI; and
    adjusting one or more transport block sizes (TBS) for the one or more conflicted time slots and the one or more non-conflicted time slots of each of the one or more subsequent time intervals respectively based on the first transmit power limitation, the second transmit power limitation and the third E-TFCI.

2. The method of claim 1, wherein the estimating includes:
    identifying, for the second subscription, the one or more conflicted time slots, in which at least one of the one or more additional conflicts is estimated, and
    identifying, for the second subscription, the one or more non-conflicted time slots, in which none of the one or more additional conflicts is estimated.

3. The method of claim 1, wherein the first subscription is utilized for voice communication.

4. The method of claim 1, wherein the second subscription is utilized for data communication.

5. The method of claim 1, further comprising receiving an enhanced dedicated channel (E-DCH) Absolute Grant Channel (EAGCH) grant that includes a maximum transmit power limitation and a power back off value for each of the one or more subsequent time intervals.

6. The method of claim 5, wherein the first transmit power limitation for the one or more conflicted time slots corresponds to the power back off value and the second transmit power limitation for the one or more non-conflicted time slots corresponds to the maximum transmit power limitation.

7. An apparatus for improving data throughput in a multi-subscriber identity module (SIM) user equipment (UE), comprising:
    an information register configured to acquire first timing information of a first subscription and second timing information of a second subscription;

a conflict detector configured to detect a first conflict between communications of the first subscription and the second subscription in a time slot of a first time interval;

a conflict estimator configured to estimate one or more additional conflicts in one or more subsequent time intervals based on timing of the time slot and on the first timing information and the second timing information relative to the time slot;

a transmit power determiner configured to determine, for each of the one or more subsequent time intervals, a first transmit power limitation for one or more conflicted time slots and a second transmit power limitation for one or more non-conflicted time slots, the first transmit power limitation being different than the second transmit power limitation; and a block size manager configured to determine a first enhanced dedicated channel (E-DCH) Transport Format Combination Indicator (E-TFCI) for the one or more conflicted time slots based on the first transmit power limitation, determine a second E-TFCI for the one or more non-conflicted time slots based on the second transmit power limitation, determine a third E-TFCI for each of the one or more subsequent time intervals based on the first E-TFCI and the second E-TFCI, and adjust one or more transport block sizes (TBS) for the one or more conflicted time slots and the one or more non-conflicted time slots of each of the one or more subsequent time intervals respectively based on the first transmit power limitation and the second transmit power limitation and the third E-TFCI.

8. The apparatus of claim 7, wherein the first subscription is utilized for voice communication.

9. The apparatus of claim 7, wherein the conflict estimator is further configured to:
identify, for the second subscription, the one or more conflicted time slots, in which at least one of the one or more additional conflicts is estimated, and
identify, for the second subscription, the one or more non-conflicted time slots, in which none of the one or more additional conflicts is estimated.

10. The apparatus of claim 7, wherein the second subscription is utilized for data communication.

11. The apparatus of claim 7, wherein the transmit power determiner is further configured to receive an enhanced dedicated channel (E-DCH) Absolute Grant Channel (EAGCH) grant that includes a maximum transmit power limitation and a power back off value for each of the one or more subsequent time intervals.

12. The apparatus of claim 11, wherein the first transmit power limitation for the one or more conflicted time slots corresponds to the power back off value and the second transmit power limitation for the one or more non-conflicted time slots corresponds to the maximum transmit power limitation.

13. A non-transitory computer-readable medium storing computer executable code for improving data throughput in a multi-subscriber identity module (SIM) user equipment (UE), comprising:
code for acquiring first timing information of a first subscription and second timing information of a second subscription;
code for detecting a first conflict between communications of the first subscription and the second subscription in a time slot of a first time interval;
code for estimating one or more additional conflicts in one or more subsequent time intervals based on timing of the time slot and on the first timing information and the second timing information relative to the time slot;

code for determining, for each of the one or more subsequent time intervals, a first transmit power limitation for one or more conflicted time slots and a second transmit power limitation for one or more non-conflicted time slots, the first transmit power limitation being different than the second transmit power limitation;

code for determining a first enhanced dedicated channel (E-DCH) Transport Format Combination Indicator (E-TFCI) for the one or more conflicted time slots based on the first transmit power limitation;

code for determining a second E-TFCI for the one or more non-conflicted time slots based on the second transmit power limitation;

code for determining a third E-TFCI for each of the one or more subsequent time intervals based on the first E-TFCI and the second E-TFCI; and code for adjusting one or more transport block sizes (TBS) for the one or more conflicted time slots and the one or more non-conflicted time slots of each of the one or more subsequent time intervals respectively based on the first transmit power limitation and the second transmit power limitation and the third E-TFCI.

14. The non-transitory computer-readable medium of claim 13, wherein the first subscription is utilized for voice communication.

15. The non-transitory computer-readable medium of claim 13, wherein the second subscription is utilized for data communication.

16. The non-transitory computer-readable medium of claim 13, further comprising code for receiving an enhanced dedicated channel (E-DCH) Absolute Grant Channel (EAGCH) grant that includes a maximum transmit power limitation and a power back off value for each of the one or more subsequent time intervals.

17. The non-transitory computer-readable medium of claim 16, wherein the first transmit power limitation for the one or more conflicted time slots corresponds to the power back off value and the second transmit power limitation for the one or more non-conflicted time slots corresponds to the maximum transmit power limitation.

18. An apparatus for improving data throughput in a multi-subscriber identity module (SIM) user equipment (UE), comprising:
means for acquiring first timing information of a first subscription and second timing information of a second subscription;
means for detecting a first conflict between communications of the first subscription and the second subscription in a time slot of a first time interval;
means for estimating one or more additional conflicts in one or more subsequent time intervals based on timing of the time slot and on the first timing information and the second timing information relative to the time slot;
means for determining, for each of the one or more subsequent time intervals, a first transmit power limitation for one or more conflicted time slots and a second transmit power limitation for one or more non-conflicted time slots, the first transmit power limitation being different than the second transmit power limitation;
means for determining a first enhanced dedicated channel (E-DCH) Transport Format Combination Indicator (E-TFCI) for the one or more conflicted time slots based on the first transmit power limitation;

means for determining a second E-TFCI for the one or more non-conflicted time slots based on the second transmit power limitation;
means for determining a third E-TFCI for each of the one or more subsequent time intervals based on the first E-TFCI and the second E-TFCI; and
means for adjusting one or more transport block sizes (TBS) for the one or more conflicted time slots and the one or more non-conflicted time slots of each of the one or more subsequent time intervals respectively based on the first transmit power limitation and the second transmit power limitation and the third E-TFCI.

19. The apparatus of claim 18, wherein the first subscription is utilized for voice communication.

20. The apparatus of claim 18, wherein the second subscription is utilized for data communication.

21. The apparatus of claim 18, further comprising means for receiving an enhanced dedicated channel (E-DCH) Absolute Grant Channel (EAGCH) grant that includes a maximum transmit power limitation and a power back off value for each of the one or more subsequent time intervals.

22. The apparatus of claim 21, wherein the first transmit power limitation for the one or more conflicted time slots corresponds to the power back off value and the second transmit power limitation for the one or more non-conflicted time slots corresponds to the maximum transmit power limitation.

23. The method of claim 1, wherein the one or more conflicted time slots includes one or more times slots of the one or more subsequent time intervals estimated to include conflicting communications between the first subscription and the second subscription, and the one or more non-conflicted time slots includes one or more time slots of the one or more subsequent time intervals estimated to include non-conflicting communications between the first subscription and the second subscription.

* * * * *